US007503943B2

(12) United States Patent
Tsukamoto et al.

(10) Patent No.: US 7,503,943 B2
(45) Date of Patent: Mar. 17, 2009

(54) FLUORINATED CARBON ACTIVE MATERIAL

(75) Inventors: Hisashi Tsukamoto, Saugus, CA (US); Kaname Takeya, Stevenson Ranch, CA (US); Hiroyuki Yumoto, Stevenson Ranch, CA (US); M. Elizabeth Bush, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 288 days.

(21) Appl. No.: 11/387,622

(22) Filed: Mar. 22, 2006

(65) Prior Publication Data

US 2006/0162150 A1 Jul. 27, 2006

Related U.S. Application Data

(63) Continuation of application No. 10/272,415, filed on Oct. 15, 2002, now Pat. No. 7,052,802.

(51) Int. Cl.
| | |
|---|---|
| H01M 4/82 | (2006.01) |
| H01M 4/58 | (2006.01) |
| H01M 4/66 | (2006.01) |
| H01M 4/62 | (2006.01) |

(52) U.S. Cl. .................. 29/623.5; 429/231.7; 429/245; 429/217

(58) Field of Classification Search ................. 429/223; 29/623.5

See application file for complete search history.

(56) References Cited

U.S. PATENT DOCUMENTS 3,514,337 A 5/1970 Braeuer et al.

(Continued)

FOREIGN PATENT DOCUMENTS

EP 000886332 A1 12/1998

(Continued)

OTHER PUBLICATIONS

Croce et al., A Novel Concept for the Synthesis of an Improved LiFePo$_4$ Lithium Battery Cathode, Electroechemical and Solid-State Letters, 2002, A47-A50, 5(3).

(Continued)

*Primary Examiner*—Dah-Wei D Yuan
*Assistant Examiner*—Bryant Suitte
(74) *Attorney, Agent, or Firm*—Gavrilovich, Dodd & Lindsey LLP

(57) ABSTRACT

Disclosed is an improved type of fluorinated carbon ($CF_x$) for use in electrical storage devices such as batteries and capacitors. The $CF_x$ is coated with a conductive material such as gold or carbon using vapor deposition. The resulting material exhibits better conductivity with concomitant lower impedance, higher electrical stability, and improved potential throughout the useful life of the device, as compared to uncoated $CF_x$. The improved conductivity reduces the amount of nonactive material (e.g., carbon black) that needs to be added, thus improving the volumetric energy density. In addition, cells made with the subject $CF_x$ exhibit more constant voltages and higher overall voltage (2.0 volts with a lithium metal anode) throughout their useful life. Chemical or physical vapor deposition techniques to deposit a variety of metals or carbon may be used to create the improved $CF_x$. The coated $CF_x$ may be used in primary or secondary batteries, as well as capacitors and hybrid devices. Methods for making and using the coated $CF_x$ are described.

33 Claims, 1 Drawing Sheet

U.S. PATENT DOCUMENTS

| | | | |
|---|---|---|---|
| 3,536,532 | A | 10/1970 | Watanabe et al. |
| 3,892,590 | A | 7/1975 | Gunther |
| 3,922,174 | A | 11/1975 | Heller |
| 4,163,829 | A | 8/1979 | Kronenberg |
| 4,863,814 | A | 9/1989 | Mohri et al. |
| 4,931,240 | A | 6/1990 | Tajima et al. |
| 4,967,025 | A | 10/1990 | Maeda et al. |
| 5,175,066 | A | 12/1992 | Hamwi et al. |
| 5,180,642 | A | 1/1993 | Weiss et al. |
| 5,667,916 | A | 9/1997 | Ebel et al. |
| 5,712,062 | A | 1/1998 | Yamana et al. |
| 5,716,466 | A | 2/1998 | Yamaoka et al. |
| 6,068,921 | A | 5/2000 | Yamana et al. |
| 6,211,065 | B1 | 4/2001 | Xi et al. |
| 6,332,900 | B1 | 12/2001 | Muffoletto et al. |
| 6,358,649 | B1 | 3/2002 | Yazami et al. |
| 6,551,744 | B1 * | 4/2003 | Ohzuku et al. .............. 429/223 |
| 6,589,696 | B2 | 7/2003 | Matsubara et al. |
| 2002/0041997 | A1 | 4/2002 | Muffoletto et al. |
| 2002/0098410 | A1 | 7/2002 | Leysieffer et al. |
| 2003/0138697 | A1 | 7/2003 | Leising et al. |
| 2003/0138698 | A1 | 7/2003 | Lee et al. |
| 2004/0163235 | A1 | 8/2004 | Feil et al. |

FOREIGN PATENT DOCUMENTS

| | | | |
|---|---|---|---|
| EP | 0 910 547 | B1 | 7/2001 |
| JP | 58128657 | A | 8/1983 |
| JP | 59083353 | A | 5/1984 |
| JP | 61117503 | A | 6/1986 |
| JP | 62188168 | A | 8/1987 |
| JP | 01089144 | A2 | 4/1989 |
| JP | 05047385 | A2 | 2/1993 |
| JP | 7335263 | A2 | 12/1995 |
| JP | 10275619 | A2 | 10/1998 |
| JP | 2000067905 | A2 | 3/2000 |
| JP | 2002063894 | A2 | 2/2002 |
| JP | 2002141058 | A2 | 5/2002 |

OTHER PUBLICATIONS

Ping et al.; Fabrication of LiV/sub 2/O/sub 5/ thin-film electrodes for rechargeable lithium batteries; Dialog Abstract for Elsevier; Solid State Ionics; col. 111, No. 1-2; pp. 145-151; 1998; Netherlands.

Endo et al. Lithium primary battery with high electrical potential using fluorinated graphite fibers of second-stage intercalation; Dialog Abstract for Elsevier; Electrical Engineering in Japan; col. 110, No. 7; pp. 13-21; 1990; US.

Fahys et al.; Lithium nitrate and lithium trifluoromethanesulfonate ammoniates fro electrolytes in lithium batteries; Dialog Abstract for Elsevier, Journal of Power Sources; vol. 34, No. 2; pp. 183-188; 1991; Switzerland.

Endo et al; Discharge characteristics of a lithium battery with fibrous carbon fluoride; Dialog Abstract for Elsevier; Journal of Power Sources; vol. 20, No. 1-2; pp. 99-104; 1987; Switzerland.

Momose et al.; X-ray photoelectron spectroscopy analyses of lithium intercalation and alloying reaction son graphite electrodes; Journal of Power Sources; vol. 68; pp. 208-211; 1997.

Suzuki et al.; Li mass transfer through a metallic copper film on a carbon fiber during the electrochemical insertion/extraction reaction; Electrochemical and Solid State letters; vol. 4(1); pp. A1-A4; 2001.

Kim et al.; Electrochemical performance of natural graphite by surface modification using aluminum; Electrochemical and Solid State Letters; vol. 4(8); pp. A109-A112; 2001.

* cited by examiner

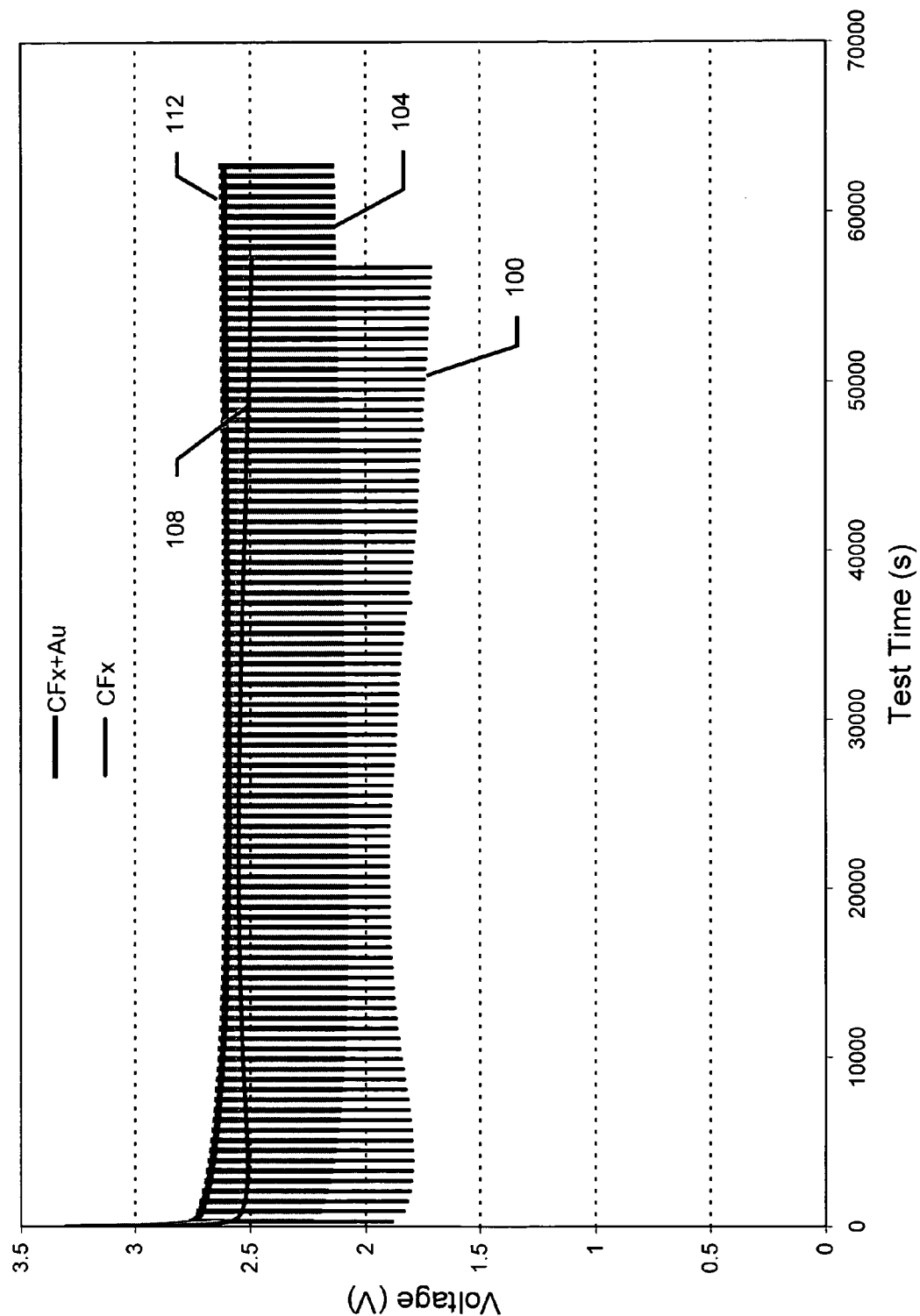

FLUORINATED CARBON ACTIVE MATERIAL

REFERENCE TO PRIOR FILED APPLICATIONS

This application is a Continuation of U.S. patent application Ser. No. 10/272,415, filed Oct. 15, 2002 now U.S. Pat. No. 7,052,802, which is incorporated herein by reference in its entirety.

GOVERNMENT LICENSE RIGHTS

Not applicable

FIELD OF THE INVENTION

This invention relates to electrical storage cells, more particularly lithium batteries and capacitors using fluorinated carbon (CFx) as an electrode material. The method of the present invention significantly improves overall performance by increasing conductivity through the surface coating by deposition of conductive material.

BACKGROUND OF THE INVENTION

Fluorinated carbon (or Carbon Fluoride; hereinafter, CFx) has long been used in a CFx/Li primary battery as a Cathode. (See e.g., U.S. Pat. No. 3,536,532 to Watanabe.) It is a stable material; therefore, batteries containing a CFx cathode have low self-discharge rates and are stable over a wide range of temperatures. However, the material has relatively low electrical conductivity requiring a high amount of conductive additive such as carbon to comprise an electrode. Typically, a CFx electrode contains about 10 wt % of acetylene black (or other conductive additive), reducing a battery's volume energy density significantly.

The present invention fundamentally involves coating or depositing on the CFx particles a conductive material by means of vapor deposition, such as sputtering, laser ablation, or similar processes. This significantly reduces the amount of conductive additive, improves a CFx cathode's volume energy density, improves CFx's high rate discharge capability, and exhibits more stable electrical characteristics.

SUMMARY OF THE INVENTION

The CFx cathode made by the method of the present invention has deposited on it a conductive material (carbon and/or metal) by means of vapor deposition (e.g., sputtering, or laser ablation), nominally at room temperature, to below 650° C. The deposition may take place in a vacuum atmosphere, a low-pressure inert gas atmosphere (e.g., argon) or under pressure to about 10 atmospheres. The deposition process uses a carbonaceous organic vapor to deposit carbon and/or metallized carbonaceous organic vapor to deposit metal with or without carbon, or an inert atmosphere (e.g., argon). A follow-on heat treatment may also be employed at temperatures up to around 650° C. However, the best mode of the present invention does not require such treatment.

Vapor deposition in a vacuum or low pressure argon gas results in the CFx being surface coated. Vapor deposition in a pressurized atmosphere (and optionally at elevated temperatures to about 650° C.) forces the conductive material into the CFx particle.

CFx materials are known in the art, and are commercially available, for example, from Daikin Industries, LTD, Japan. Various processes are used to produce CFx, with some being described as "high temperature", or "HT", and some being "low temperature", or "LT". Examples of each can be found described in U.S. Pat. Nos. 5,712,062 and 6,068,921 to Yamana et al, assigned to Daikin Industries, Ltd., Osaka, Japan, and in U.S. Pat. No. 6,358,649 to Yazami et al., entitled, "Carbons containing fluorine, method of preparation thereof and use as electrode material," all of which are hereby incorporated herein by reference in their entirety. The material of Yazami et al. is reportedly more conductive that other types known in the art, and therefore may be preferred for use in the present invention.

TABLE 1

| | Candidate Elements |
|---|---|
| Most Preferred | Ag (6.21)*, Au (4.55), Rh(2.08), Ir (1.96) Pt (.96) Pd (.95), C (0.2) |
| Less Preferred | Cu (5.88), Al (3.65), Be (3.08), Ca (2.78), Mg (2.33), W (1.89), Mo (1.89), Co (1.72), Zn (1.69), Ni (1.43), Cd (1.38), Ru (1.35), In (1.14), Os (1.1), Fe (1.02), Fe (1.02) Sn (0.91), Cr (0.78), Ta (0.76), Tc (0.7), Nb (0.69), Ga (0.67), TL (0.61), Re (0.54), V (0.5), Pb (0.48), Sr (0.47), Si (0.42), Hf (0.33), Ba (0.26), Zr (0.24), Sb (0.24), Ti (0.23), Po (0.22), Sc (0.21), Y (0.17), Lu (0.13). |

*Numbers in parentheses are conductivity: $10^5 (\Omega cm)^{-1}$

Normally, where a metal is used, gold is preferred, but other conductive materials such as shown in Table 1 and mixtures or alloys thereof may be substituted or added. Preferred deposition materials are gold, silver, platinum, rhodium, palladium, iridium, and carbon which have low contact resistance. Alloys of the most preferred metals are possible, and superior to use of the less-preferred materials. Standard, well-known coating or deposition techniques may be utilized including both chemical and physical deposition, coating, argon sputtering, vacuum sputtering, laser ablation, or similar processes. Low temperature vapor deposition may be utilized in which a carbonaceous gas, such as acetylene, is heated to deposit carbon onto CFx particles. Metals that have a tendency for high surface oxidation may be coated with lower oxidizing metals. For example, copper or aluminum may be deposited, followed by gold to maintain high surface conductivity. The conductive layer deposited on the CFx may be metallic or carbon, and can be a porous film or dispersed, discrete island structures. As used herein, "coat" or "coating" shall include all deposition conformations or distributions, whether contiguous or dispersed, regardless of the proportion of surface being covered.

The inventors have found cells made utilizing gold coated CFx exhibit lower internal resistance, higher overall voltage, and much more stable voltage characteristics. Furthermore, vapor-depositing the conductive material onto CFx requires less conductive material but provides better contact than simply mixing conductive additive power with CFx.

The same cathode of the present invention may also be advantageously used in secondary cells, capacitors, and in devices combining features of capacitors and electrical storage cells.

A wide variety of electrolyte salts may advantageously be used, including LiPF6 or Lithium bis(oxalato)borate (Li-BOB).

OBJECTIVES OF THE INVENTION

Accordingly, it is an objective to provide an electrochemical storage device with reduced internal impedance.

It is a further objective to provide an electrochemical storage device which exhibits relatively constant voltage during discharge.

It is a further objective to provide an electrochemical storage device with increased volumetric energy density.

Other features and advantages of the invention will be apparent from the claims, and from the following detailed description.

BRIEF DESCRIPTION OF THE DRAWINGS

FIG. 1 is a graph of discharge voltage profile of a test cell made according to the present invention compared with a reference cell.

DETAILED DESCRIPTION

The present invention resulted from the discovery that coating CFx with conductive material, rather than mixing it with such material as carbon, improved its electrical characteristics, including increased conductivity, increased volume energy density, more constant discharge voltages, and higher overall voltage. A better understanding of the invention may be obtained by review of the following specific example.

EXAMPLE

A sandwich type gold coated CFx cell and a reference sandwich type conventional CFx cell were produced in accordance with the invention. The test cell cathode material was prepared by argon sputtering deposition of gold on CFx. The deposition was carried out as follows:

1. A glass plate with 1.6 g CFx powder was placed in a vacuum chamber.
2. The vacuum chamber was evacuated to approximately 50-80 millitorr.
3. The chamber was flushed with argon gas.
4. The vacuum chamber was filled with Ar gas. Pressure was kept at 80 millitorr.
5. 7-8.5 volts was applied to the Ar gas to form a plasma.
6. The plasma hit a gold plate to generate Au vapor. Plasma current was kept around 15 milliamperes.
7. The gold was permitted to deposit on the CFx powder five times for 3 minutes each time. Between each sputtering deposition interval, the powder was agitated.

The CFx so prepared was then used in assembling the test cell. The reference cell was prepared in every respect in the same way, except there was no deposition of gold or other conductive material on the CFx.

The anode in both cells was pure lithium metal with Cu substrate. The electrolyte was a salt consisting of 1.2 molar LiPF6 in 25 wt % EC, 75 wt % DEC and a cathode according to the following composition:

| | |
|---|---|
| CFx (+ Au): | 85 wt % |
| PTFE: | 3 wt % |
| CMC | 2 wt % |
| Acetylene Black: | 10 wt %. |

The above electrode composition is believed by the inventors to constitute the best mode of the present invention. The use of argon sputtering is believed to be the best mode for depositing the conductive material (gold) onto the CFx.

The above components were mixed with a solvent and coated on a 20 μm aluminum substrate. The solvent was then evaporated at 80° C. leaving the cathode composed of the listed components which was then calendared to the desired thickness. Calendaring or pressing is commonly used to compress the material and adhere it to the substrate. As used herein, "compressing" shall include all methods of applying pressure, including calendaring and pressing.

The CFx used in the above example was obtained from Daikin Industries, LTD, and was Grade number CF-GM, wherein x=0.9-1.1.

It was found that utilizing a combination of two binders polytetrafluoroethylene (PTFE) and carboxymethyl cellulose (CMC)) resulted in improved stability of the viscosity of the coating paste during the coating process. This improves manufacturability by improving the nature of the coating for better handling. Specifically, the coating paste maintains the same viscosity throughout the coating process. The binders are individually well-known in the art, but combining them in a single cathode showed surprisingly beneficial results with regard to the consistency and manufacturability of the electrode material. Other binders may be substituted or added, including polyvinylidene fluoride (PVDF), polyvinyl alcohol (PVA), and styrene butadiene rubber (SBR). Similarly, other substrates besides aluminum may be used, including but not limited to stainless steel, titanium, and alloys thereof, with aluminum and stainless steel being preferred. Based on the data presented below, the conductive additive (e.g., acetylene black) content may be reduced to about 1 wt % to about 5 wt %, which is 2 to 10 volume %, significantly increasing volumetric energy density while maintaining adequate conductivity. Other types of carbon black or other conductive materials such as graphite may be substituted for acetylene black, or added to it. The inventors have noted that the amount of binder required is partly dependent on the amount of conductive additive used; because of the large surface area of the conductive additive, if the amount of conductive additive is reduced from 10 wt % to about 5 wt %, the total amount of binder may be reduced from 5 wt % to between 1 and 3 wt %.

FIG. 1 shows the comparative results of pulse discharge testing of both cells. Pulse discharge testing of test cells made according to the present method and reference cells made without deposition of a conductive material on the CFx cathode over approximately 1000 minutes (60,000 seconds) of 0.005 C with a discharge pulse of 0.5 C for 10 ms at every 10 minutes (600 seconds) demonstrated the highly beneficial effects of the present invention. The two lower traces 100 and 104 represent the respective voltages measured during each 0.5 C pulse discharge ("pulse discharge voltage"). Trace 100 is the pulse discharge voltage of the cell with untreated CFx. Trace 104 is the pulse discharge voltage of the cell with gold-coated CFx. The upper traces 108 and 112 represent the respective cell voltages during the 10-minute 0.005 C discharge ("normal discharge voltage"). Trace 108 is the normal discharge voltage of the cell with untreated CFx. Trace 112 is the normal discharge voltage of the cell having a gold-coated CFx cathode. It may be seen that the reference cells (no gold) exhibited about 0.7 V or more drop during each pulse discharge, while the test cells (with gold) dropped only about 0.5 V. Moreover, the reference battery voltage in the reference cell initially dropped from about 3.25 V to about 2.5 V and gradually climbed back to a peak of about 2.6 V over the first 25,000 seconds before it began to drop off gradually to 2.5 V over the course of the pulse discharge. This is compared to the test cell (with gold) which exhibited a much more stable discharge curve, spiking down from 3.25 V in the first discharge to 2.75 V, then gradually decaying to a minimum of 2.6 V over about 25,000 seconds and stabilizing to almost a flat line. This much more stable discharge voltage profile is highly beneficial, particularly in medical applications.

Significantly, during each 0.5 C pulse discharge, the reference cells voltages dropped to 1.7 V to 1.9 V. The test cells (with gold deposited on CFx) dropped to a minimum of 2.1 V to 2.2 V. Therefore, cells made according to the present method will operate devices requiring a 2.0 V minimum, as the cells will maintain at least 2.0 volts throughout their useful life. The present invention is particularly suited to medical devices, notably implanted batteries where stability, longevity, safety are paramount, and where changing primary batteries requires surgical intervention.

The CFx of the present invention may also be mixed with other active materials. An "active material" is a chemically reactive material at the positive or negative electrode that takes part in the charge and discharge reactions. In a lithium battery positive electrode, it can be any material capable of absorbing lithium ions. Such materials are well-known to those skilled in the art. Mixing of two or more active materials may be used to improve better end-of-life indication. See e.g., U.S. Pat. No. 5,667,916 issued to Ebel et al. disclosing using two mixed cathode materials, each with a discrete voltage characteristic. In the present invention, mixing of a second or additional active material may be done before or after treating the CFx powder with a conductive coating. If treated after mixing, the entire mixture of powders may receive beneficial results. The second or more active materials should be in an amount less than that of the CFx, and preferably less than about 20 wt % of the CFx.

It should be noted that others have deposited metals onto the negative active material, graphite, to accelerate the electrochemical rates of inter- and de-intercalation of Li in the substrate carbon. See e.g., Suzuki et al., "Li Mass Transfer through a Metallic Copper Film on a Carbon Fiber During the Electrochemical Insertion/Extraction Reaction," Electrochemical and Solid State Letters, 4(1)A1-A4 (2001) and Momose et al., "X-ray Photoelectron Spectroscopy Analysis of Lithium Intercalation and Alloying Reactions on Graphite Electrodes," J. Power Sources 209-211 (1997). In contrast, the method of the present invention, and active electrode material produced thereby, solves a different problem, that problem being high contact resistance in the positive active material, $CF_x$. $CF_x$ is a very different material from graphite, and the reaction of Li ion with $CF_x$ is not an intercalation reaction. Li ions do not intercalate into $CF_x$; Li ions simply react with $CF_x$ and create LiF. The present invention does not assist in lithium ion intercalation, but only reduces the contact resistance of $CF_x$.

From the foregoing, it is apparent that the processes provided by the invention enable production of superior-performing electrochemical storage devices that are characterized by relatively stable voltage over their lifetime, improved internal conductivity (and concomitant reduced internal impedance), and improved volumetric energy density (as compared with prior art). The invention thereby provides the ability to produce, among other things, storage cells capable of powering devices requiring 2.0 V minimum operating voltage. The devices are particularly suited to medical applications, notably implantable medical devices.

The specific implementations disclosed above are by way of example and for enabling persons skilled in the art to implement the invention only. We have made every effort to describe all the embodiments we have foreseen. There may be embodiments that are unforeseeable and which are insubstantially different. We have further made every effort to describe the methodology of this invention, including the best mode of practicing it. Any omission of any variation of the method disclosed is not intended to dedicate such variation to the public, and all unforeseen, insubstantial variations are intended to be covered by the claims appended hereto. Accordingly, the invention is not to be limited except by the appended claims and legal equivalents.

What is claimed is:

1. A method of generating an electrochemical storage device, comprising:
    coating carbon fluoride ($CF_x$) with a conducting material so as to form coated $CF_x$, wherein coating the carbon fluoride ($CF_x$) with the conducting material includes chemical deposition, vapor deposition, sputtering, or laser ablation of the conducting material on the $CF_x$;
    combining the coated $CF_x$ with one or more binders to form a mixture, the mixture being formed after coating the carbon fluoride ($CF_x$); and
    employing the mixture to generate a cathode that includes the coated $CF_x$ and the one or more binders.

2. The method of claim 1, wherein coating the carbon fluoride ($CF_x$) with the conducting material includes vapor deposition of the conducting material on the carbon fluoride ($CF_x$).

3. The method of claim 1, wherein coating the carbon fluoride ($CF_x$) with the conducting material includes sputtering of the conducting material on the $CF_x$.

4. The method of claim 1, wherein coating the carbon fluoride ($CF_x$) with the conducting material includes chemical deposition of the conducting material on the $CF_x$.

5. The method of claim 1, wherein coating the carbon fluoride ($CF_x$) with the conducting material includes laser ablation of the conducting material on the $CF_x$.

6. The method of claim 1, wherein the conducting material coated on the $CF_x$ includes metal and/or carbon.

7. The method of claim 6, wherein the conducting material coated on the $CF_x$ includes metal and excludes carbon.

8. The method of claim 6, wherein the conducting material coated on the $CF_x$ includes carbon.

9. The method of claim 1, wherein combining the coated $CF_x$ with one or more binders includes combining the coated $CF_x$ with the one or more binders and with one or more active materials and the cathode includes the coated $CF_x$, the one or more binders and the one or more active materials.

10. The method of claim 1, wherein combining the coated $CF_x$ with one or more binders includes combining the coated $CF_x$ with the one or more binders and with one or more conductive additives and the cathode includes the coated $CF_x$, the one or more binders and the one or more conductive additives.

11. The method of claim 1, wherein combining the coated $CF_x$ with one or more binders includes mixing the coated $CF_x$ with the one or more binders and one or more solvents to form a mixture, and
    employing the mixture to generate the cathode includes coating a substrate with the mixture, and evaporating the solvent from the mixture.

12. The method of claim 1, wherein coating the carbon fluoride ($CF_x$) with the conducting material includes:
    providing a powder or granulated sample of the carbon fluoride ($CF_x$);
    placing the carbon fluoride ($CF_x$) in a deposition chamber;
    enclosing a conducting material in the deposition chamber;
    filling the deposition chamber wit an inert gas;
    applying an electrical voltage to the inert gas to form a plasma; and
    allowing the conducting material to vaporize and deposit on the $CF_x$.

13. The method of claim 1, wherein the one or more binders is selected from the group consisting of: PTFE, CMC, PVDF, PVA, and SBR.

14. The method of claim 1, wherein combining the coated $CF_x$ with one or more binders includes combining the coated $CF_x$ with a plurality of binders.

15. A method of generating an electrochemical storage device, comprising:
   coating carbon fluoride ($CF_x$) with a conducting material so as to form coated $CF_x$, wherein coating the carbon fluoride ($CF_x$) with the conducting material includes chemical deposition, vapor deposition, sputtering, or laser ablation of the conducting material on the $CF_x$;
   combining the coated $CF_x$ with one or more conductive additives to form a mixture, the mixture being formed after coating the carbon fluoride ($CF_x$); and
   employing the mixture to generate a cathode that includes the coated $CF_x$ and the one or more conductive additives.

16. The method of claim 15, wherein coating the carbon fluoride ($CF_x$) with the conducting material includes vapor deposition of the conducting material on the carbon fluoride ($CF_x$).

17. The method of claim 15, wherein coating the carbon fluoride ($CF_x$) with the conducting material includes sputtering of the conducting material on the $CF_x$.

18. The method of claim 15, wherein coating the carbon fluoride ($CF_x$) with the conducting material includes chemical deposition of the conducting material on the $CF_x$.

19. The method of claim 15, wherein coating the carbon fluoride ($CF_x$) with the conducting material includes laser ablation of the conducting material on the $CF_x$.

20. The method of claim 15, wherein the conducting material coated on the $CF_x$ includes metal and/or carbon.

21. The method of claim 20, wherein the conducting material coated on the $CF_x$ includes metal and excludes carbon.

22. The method of claim 20, wherein the conducting material coated on the $CF_x$ includes carbon.

23. The method of claim 15, wherein combining the coated $CF_x$ with one or more conductive additives includes combining the coated $CF_x$ with the one or more conductive additives and with one or more active materials and the cathode includes the coated $CF_x$, the one or more binders and the one or more active materials.

24. The method of claim 15, wherein combining the coated $CF_x$ with one or more conductive additives includes mixing the coated $CF_x$ with the one or more conductive additives and one or more solvents to form a mixture, and
   employing the mixture to generate the cathode includes coating a substrate with the mixture, and evaporating the solvent from the mixture.

25. The method of claim 15, wherein coating the carbon fluoride ($CF_x$) with the conducting material includes:
   providing a powder or granulated sample of the carbon fluoride ($CF_x$);
   placing the carbon fluoride ($CF_x$) in a deposition chamber;
   enclosing a conducting material in the deposition chamber;
   filling the deposition chamber with an inert gas;
   applying an electrical voltage to the inert gas to form a plasma; and
   allowing the conducting material to vaporize and deposit on the $CF_x$.

26. The method of claim 15, wherein the one or more conductive additives is about 1 wt % to about 5 wt % of the cathode.

27. The method of claim 15, wherein in the one or more conductive additives includes carbon.

28. A method of generating an electrochemical storage device, comprising:
   coating carbon fluoride ($CF_x$) with a conducting material so as to form coated $CF_x$,
      the coated $CF_x$ having a coating of the conducting material on the carbon fluoride ($CF_x$), the coating being in accordance with a coating formed by vapor deposition of the conducting material on the carbon fluoride ($CF_x$);
   combining the coated $CF_x$ with one or more binders to form a mixture, the mixture being formed after coating the carbon fluoride ($CF_x$); and
   employing the mixture to generate a cathode that includes the coated $CF_x$ and the one or more binders.

29. The method of claim 28, wherein the conducting material coated on the $CF_x$ includes metal and/or carbon.

30. The method of claim 28, wherein the conducting material coated on the $CF_x$ includes metal and excludes carbon.

31. The method of claim 28, wherein the conducting material coated on the $CF_x$ includes carbon.

32. The method of claim 28, wherein combining the coated $CF_x$ with one or more binders includes combining the coated $CF_x$ with the one or more binders and with one or more conductive additives and the cathode includes the coated $CF_x$, the one or more binders and the one or more conductive additives.

33. A method of generating an electrochemical storage device, comprising:
   coating carbon fluoride ($CF_x$) with a conducting material so as to form coated $CF_x$,
      the coated carbon fluoride ($CF_x$) having a coating of the conducting material on the carbon fluoride ($CF_x$), the coating being in accordance with a coating formed by vapor deposition of the conducting material on to carbon fluoride ($CF_x$);
   combining the coated $CF_x$ with one or more conductive additives to form a mixture, the mixture being formed after coating the carbon fluoride ($CF_x$); and
   employing the mixture to generate a cathode that includes the coated $CF_x$ and the one or more conductive additives.

* * * * *